United States Patent [19]

Iwamoto et al.

[11] Patent Number: 4,814,927
[45] Date of Patent: Mar. 21, 1989

[54] MAGNETIC DISK CARTRIDGE

[75] Inventors: Shoji Iwamoto; Akira Mizuta; Tadashi Irie; Masanori Ishiguro, all of Kanagawa, Japan

[73] Assignee: Fuji Photo Film Co., Ltd., Kanagawa, Japan

[21] Appl. No.: 42,902

[22] Filed: Apr. 27, 1987

[30] Foreign Application Priority Data

Apr. 25, 1986 [JP] Japan ............................. 61-62920[U]

[51] Int. Cl.[4] ............................................. G11B 23/03
[52] U.S. Cl. ..................................................... 360/133
[58] Field of Search ................................. 360/132–133

[56] References Cited

U.S. PATENT DOCUMENTS 4,577,251 3/1986 Okada .................................. 360/133
4,677,516 6/1987 Iizuka .................................. 360/133

Primary Examiner—A. J. Heinz
Attorney, Agent, or Firm—Sughrue, Mion, Zinn, Macpeak & Seas

[57] ABSTRACT

A magnetic disk cartridge comprises a hard case, a magnetic disk sheet rotatably housed in the hard case, and a disk-shaped or polygonal liner disposed between the magnetic disk sheet and an inner wall surface of the hard case for cleaning the recording surface of the magnetic disk sheet. Internal peripheral wall sections at corners of the hard case are formed by linear portions conforming with the outer shape of the polygonal liner, and curved portions conforming with the outer shape of the disk-shaped liner.

2 Claims, 3 Drawing Sheets

MAGNETIC DISK CARTRIDGE

BACKGROUND OF THE INVENTION

1. Field of the Invention

This invention relates to a magnetic disk cartridge rotatably housing a very thin disk-shaped magnetic recording medium, i.e. a magnetic disk sheet.

2. Description of the Prior Art

Magnetic disk sheets, i.e. floppy disks, are widely used as recording media for computers because they are easy to handle and low in cost. The magnetic disk sheet comprises a disk-like base sheet made of flexible polyester or the like, and magnetic material layers overlaid on opposite surfaces of the disk-like base sheet. The magnetic disk sheet is rotated for magnetically recording information on the magnetic material layers by use of a magnetic head.

In general, writing of the information on the magnetic disk sheet or reading of the information therefrom is carried out by rotating the magnetic disk sheet and, at the same time, sliding the magnetic writing head or the magnetic reading head over the magnetic recording surface in the radial direction of the magnetic disk sheet. Therefore, when conformity of the surface of the magnetic disk sheet with the magnetic head is low or dust or the like enters the gap of the magnetic head in the course of writing or reading of the information, the signal input and/or signal output fluctuates, or drop-outs occur.

Particularly, in the case of a 3.5-inch type small magnetic disk cartridge, the outer case is formed of a hard material, and a dust-preventing shutter is disposed at an opening into which the magnetic head is to be inserted, thereby to improve reliability. Also, a disk-like liner formed of a rayon nonwoven fabric, a polyester nonwoven fabric or the like is disposed between the magnetic disk sheet and an inner wall surface of the case so that the liner slightly contacts the recording surface of the magnetic disk sheet. When the magnetic disk sheet is rotated, the liner removes dust or the like from the surface of the magnetic disk sheet.

As mentioned above, the liner formed of rayon, polyester or the like has heretofore been shaped in a disk-like form. The liner is made by cutting a sheet-like material by use of a punch having a complicated shape. However, with the punching out method, it is not always possible to maintain good cutting characteristics (sharpness), and the fibers of the liner remain in a form of ravelings at the cut section and protrude out of the case.

Accordingly, it has been proposed to make a polygonal liner by using a linear cutter such as a scissors which can maintain good cutting characteristics for long periods, and forming the outer shape of the liner into a polygonal shape such as an octagon.

However, the internal peripheral wall of the case for general disk-shaped liners is shaped in a circular shape conforming with the outer shape of the liner. Therefore, the polygonal liner cannot always be loaded into the case because of interference of the corners of the polygonal liner with the circular peripheral wall of the case. Also, when the size of the polygonal liner is decreased to such an extent that the polygonal liner can be loaded into the case, the outer shape of the polygonal liner becomes smaller than the recording surface of the magnetic disk sheet, and the cleaning effects of the polygonal liner becomes insufficient. On the other hand, the case may be fabricated to have linear internal peripheral walls in conformity with the outer shape of the polygonal liner. However, in this case, the disk-shaped liner cannot be loaded into said case. Thus the conventional techniques are not efficient and lack flexibility in application.

SUMMARY OF THE INVENTION

The primary object of the present invention is to provide a magnetic disk cartridge having internal peripheral case wall sections adapted to loading of either a disk-shaped liner or a polygonal liner such as an octagonal liner.

Another object of the present invention is to provide a magnetic disk cartridge wherein good cleaning effects are obtained either with a disk-shaped liner or with a polygonal liner.

The present invention provides a magnetic disk cartridge comprising a hard case, a magnetic disk sheet rotatably housed in the hard case, and a disk-shaped or polygonal liner disposed between the magnetic disk sheet and an inner wall surface of the hard case for cleaning the recording surface of the magnetic disk sheet, wherein the improvement comprises forming internal peripheral wall sections of said hard case by linear portions conforming with the outer shape of said polygonal liner, and curved portions conforming with the outer shape of said disk-shaped liner.

With the magnetic disk cartridge in accordance with the present invention, the internal peripheral wall sections of the case are formed by polygonal linear portions and circular arc-like curved portions. When the disk-shaped liner is loaded into the case, the outer circumferential portion of the liner is supported in contact with the curved portions of the internal peripheral wall sections of the case. When the polygonal liner is loaded into the case, the outer side portions of the liner are supported in contact with the linear portions of the internal peripheral wall sections of the case. Thus either the disk-shaped liner or the polygonal liner can be loaded into the case of the magnetic disk cartridge. Accordingly, it becomes possible to selectively use a liner having good quality, to eliminate operation failures caused by protrusion of fibers of the liner, and to achieve good cleaning effects of the liner.

DESCRIPTION OF THE PREFERRED EMBODIMENTS

Figure 1:
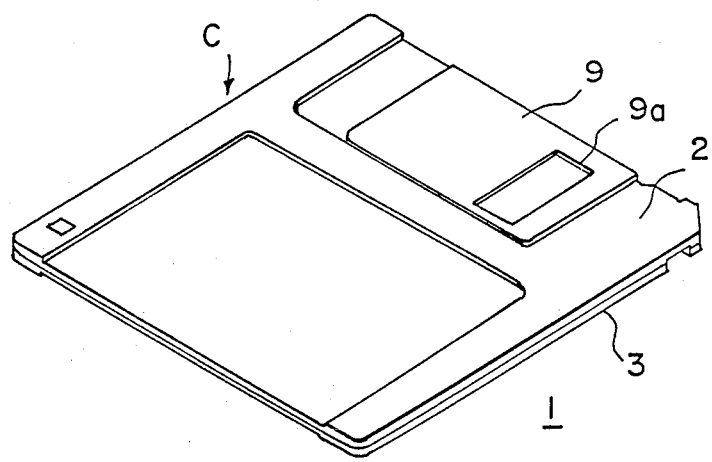
FIG. 1 is a perspective view showing the appearance of an embodiment of the magnetic disk cartridge in accordance with the/present invention.
Figure 2:
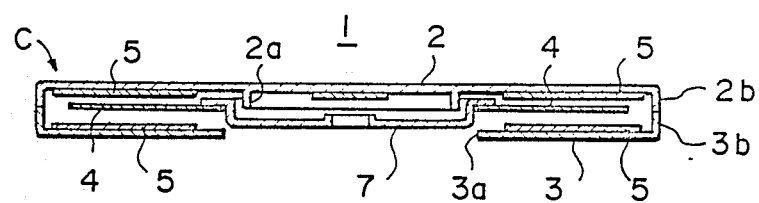
FIG. 2 is a sectional view taken along the center line of the embodiment of FIG. 1.

The present invention will hereinbelow be described in further detail with reference to the accompanying drawings.

Referring to FIGS. 1, 2, 3 and 4, a magnetic disk cartridge 1 is composed of a hard case C having an approximately regular square shape and constituted by an assembly of an upper case half 2 and a lower case half 3 formed of a comparatively hard plastic resin, a magnetic disk sheet 4 as a magnetic recording medium housed in the hard case C, and liners 5, 5 disposed on the upper and lower sides of the magnetic disk sheet 4 and formed of a nonwoven fabric or the like for protecting and cleaning the magnetic disk sheet 4.

The center portion of the magnetic disk sheet 4 is provided with a center core 7 which is to be supported by a rotation drive means (not shown) of a recording and/or reproducing apparatus. The center core 7 is exposed at an opening 3a formed at the center of the lower case half 3. Also, the center core 7 is fitted onto a ring-shaped member 2a protruding from the inner surface of the upper case half 2, and the center position of the center core 7 is defined by the ring-shaped member 2a. Each of the upper case half 2 and the lower case half 3 is provided with a rectangular opening 8 extending from the peripheral portion of the case half toward the rotation center so that a magnetic head (not shown) of the recording and/or reproducing apparatus may enter through the rectangular opening 8 and slide on the recording surface of the magnetic disk sheet 4. A dust preventing shutter 9 is provided slideably with respect to the case C for opening and closing the rectangular openings 8, 8. The shutter 9 is provided with window section 9a, 9a alignable with the rectangular openings 8, 8 and moved to close the rectangular openings 8, 8 when the magnetic disk cartridge is not in use.

Figure 6:
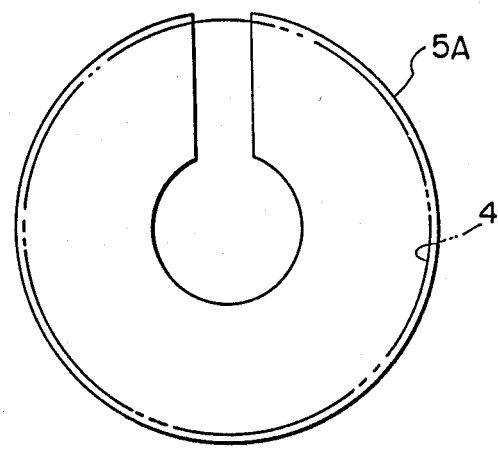
FIG. 6 is a plan view showing an example of the disk-shaped liner.
Figure 7:
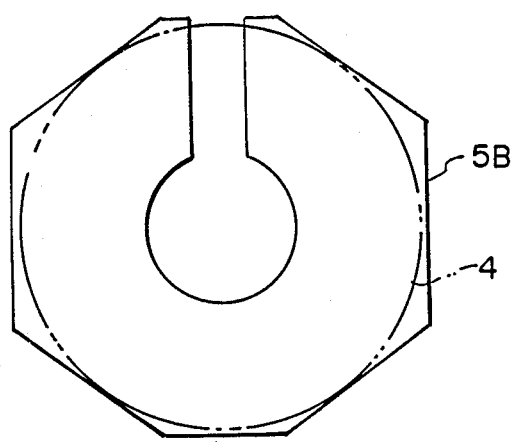
FIG. 7 is a plan view showing an example of the polygonal liner.

As each of the liners 5, 5 disposed on the upper and lower sides of the magnetic disk sheet 4, there is used a disk-shaped liner 5A shaped in a disk-like form as shown in FIG. 6 or a polygonal liner 5B formed in a polygonal shape such as an octagonal shape obtained by cutting off the corners of a regular square as shown in FIG. 7. The disk-shaped liner 5A and the polygonal liner 5B are formed to have a size covering approximately the overall area of the recording range of the recording surface of the magnetic disk sheet 4. The disk-shaped liner 5A and the polygonal liner 5B are provided with a slit-like cutaway portion extending from the peripheral portion toward the center at the position corresponding to the opening 8 where the magnetic head is to be allowed to move. An opening having a size slightly larger than the center cope 7 of the magnetic disk sheet 4 is formed at the centers of the disk-shaped liner 5A and the polygonal liner 5B.

Figure 3:
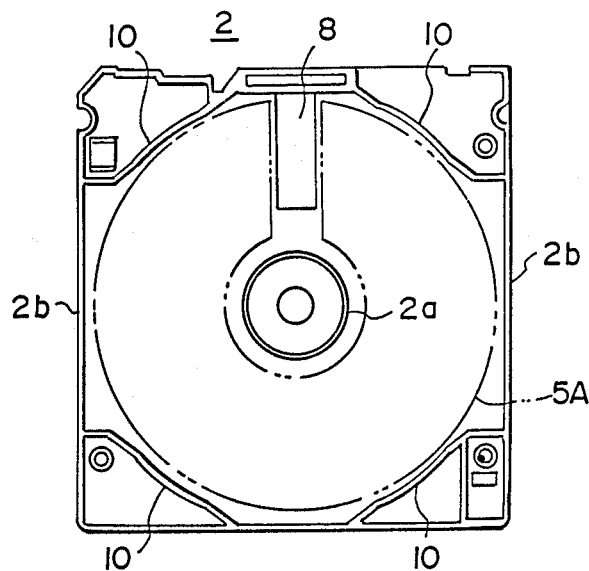
FIG. 3 is a schematic view showing the configuration on the inner side of an upper case half of the embodiment of FIG. 1.
Figure 4:
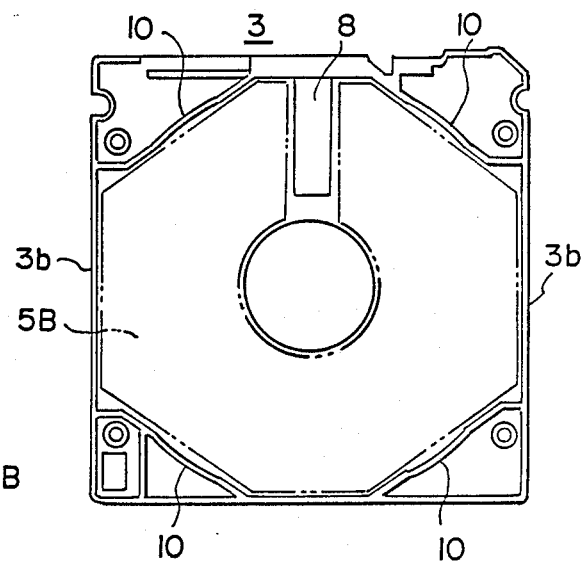
FIG. 4 is a schematic view showing the configuration on the inner side of a lower case half of the embodiment of FIG. 1.
Figure 5:
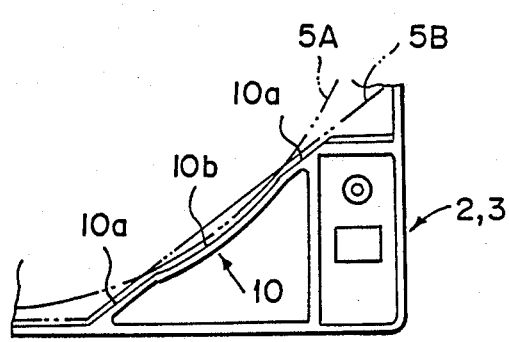
FIG. 5 is an enlarged view showing the internal peripheral wall section of the case of the embodiment of FIG. 1.

On the other hand, the upper case half 2 and the lower case half 3 for housing the disk-shaped liner 5A or the polygonal liner 5B are respectively provided with outer walls 2b, 2b and outer walls 3b, 3b, and internal peripheral wall sections 10, 10 formed at the corners to conform with the outer shapes of the disk-shaped liner 5A and the polygonal liner 5B. As shown in FIG. 5, the internal peripheral wall section 10 is composed of linear portions 10a, 10a conforming with the outer shape of the polygonal liner 5B such as the octagonal liner as shown in FIG. 7, and a curved portion 10b conforming with the outer shape of the disk-shaped liner 5A as shown in FIG. 6. Specifically, the curved portion 10b is formed as a recess between the linear portions 10a and 10a, so that the disk-shaped liner 5A can be loaded into the case as shown in FIG. 3, and the polygonal liner 5B can be loaded into the case as shown in FIG. 4.

Though the polygonal liner 5B is shaped in the octagonal form in the aforesaid embodiment, liners having other polygonal shapes can also be used, and the shapes of the internal peripheral wall sections may be modified in accordance with the polygonal shapes. Also, the shape of the upper liner may be different from the shape of the lower liner.

We claim:

1. A magnetic disk cartridge comprising a hard case, a magnetic disk sheet rotatably housed in the hard case, and a disk-shaped or polygonal liner disposed between the magnetic disk sheet and an inner wall surface of the hard case for cleaning the recording surface of the magnetic disk sheet, wherein the improvement comprises at least two upstanding internal peripheral wall sections of said hard case with each section having linear portions conforming with the outer shape of said polygonal liner, and curved portions conforming with the outer shape of said disk-shaped liner for contactedly supporting either the disk-shaped liner or polygonal liner to thereby limit movement of the same within the cartridge, each of said wall sections is composed of two linear portions and a single curved portion formed between said two linear portions.

2. A magnetic disk cartridge as defined in claim 1 wherein said polygonal liner is shaped in an octagonal form.

* * * * *